United States Patent [19]

Menges

[11] Patent Number: 5,331,087
[45] Date of Patent: Jul. 19, 1994

[54] METHOD FOR REPROCESSING THERMOPLAST-COATED PACKING MATERIALS AND THERMOPLAST MATERIAL FOR FURTHER PROCESSING

[75] Inventor: Wilhelm Menges, Brannenburg, Fed. Rep. of Germany

[73] Assignee: PWA Industriepapier GmbH, Raubling, Fed. Rep. of Germany

[21] Appl. No.: 815,349

[22] Filed: Dec. 27, 1991

[51] Int. Cl.⁵ ............................ C08F 6/00; C08J 11/04
[52] U.S. Cl. ........................................ 528/499; 521/47;
528/502; 264/37; 264/39; 264/115; 162/4;
162/29; 162/119
[58] Field of Search .................. 521/47; 528/499, 502;
264/37, 39, 115; 162/4, 29, 119

[56] References Cited

U.S. PATENT DOCUMENTS

| | | | |
|---|---|---|---|
| 1,967,313 | 7/1934 | Holland-Letz | 83/11 |
| 2,789,903 | 4/1957 | Lukman et al. | 92/21 |
| 3,051,609 | 8/1962 | Grossman et al. | 162/191 |
| 3,226,343 | 12/1965 | Rhodes | 521/47 |
| 3,271,239 | 9/1966 | Hornbostel, Jr. | 162/169 |
| 3,284,282 | 11/1966 | Immel | 162/4 |
| 3,325,345 | 6/1967 | Hider | 162/169 |
| 3,408,255 | 10/1968 | Tatum | 162/5 |
| 3,574,050 | 4/1971 | Tenafly | 162/5 |
| 4,000,031 | 12/1976 | Acobas | 162/191 |
| 4,012,561 | 3/1977 | Doughty et al. | 428/531 |
| 4,111,730 | 9/1978 | Balatinecz | 156/62.2 |
| 4,188,259 | 2/1980 | Mamers et al. | 162/4 |
| 4,193,838 | 3/1980 | Kelly et al. | 162/5 |
| 5,084,135 | 1/1992 | Brooks et al. | 762/4 |

*Primary Examiner*—Paul R. Michl
*Assistant Examiner*—LaVonda DeWitt
*Attorney, Agent, or Firm*—Marshall, O'Toole, Gerstein, Murray & Borun

[57] ABSTRACT

A method is described for reprocessing substantially used generally bilaterally plastic-coated beverage cartons or cardboard. The beverage cardboard is first comminuted with cutting tools in such a manner that isolated sheet pieces of about 5 cm diameter are obtained which in a subsequent decontaminating wash can be flushed as far as possible from all sides. The rinsing agent is withdrawn from the process and supplied directly to a biological clarifying. The precomminuted and washed cardboard is then divided in a second comminuting step into small sheet pieces of about 8 mm diameter and either simultaneously or thereafter subjected to disintegrating forces, the plastic layer particles being detached from the fibrous material substrate. The suspension thus disintegrated is separated into a fibrous fraction and a thermoplast foil fraction. After further cleaning and sorting steps the thermoplast is dried and regranulated for recycling. The substantially long-fiber fibrous component is beaten and preferably used in the production of corrugated board raw paper. As a special step, a certain amount of finely ground thermoplast material may be fixed to the fibrous material.

21 Claims, 1 Drawing Sheet

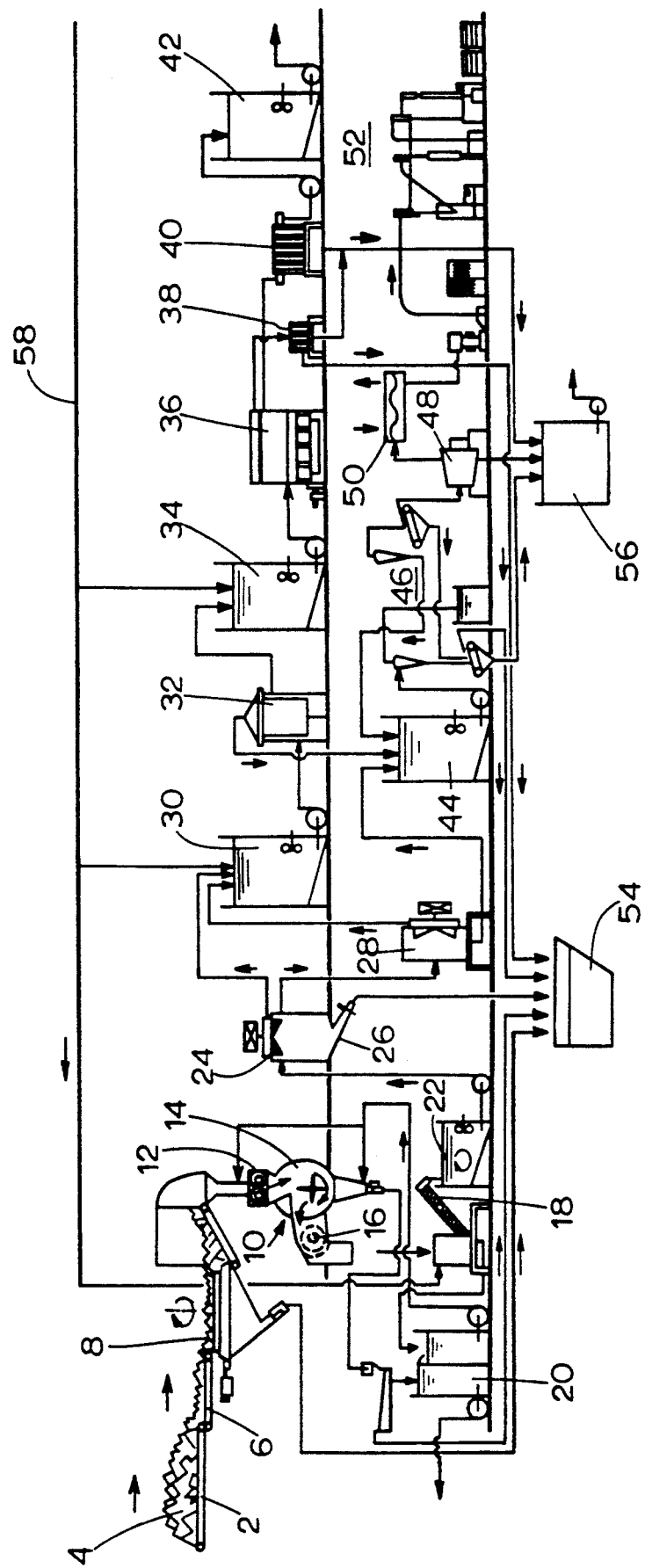

METHOD FOR REPROCESSING THERMOPLAST-COATED PACKING MATERIALS AND THERMOPLAST MATERIAL FOR FURTHER PROCESSING

DESCRIPTION

The invention relates to a method for reprocessing substantially bilaterally thermoplastic-coated packing materials comprising a carrier or substrate material comprising essentially vegetable fibrous substances. The invention further relates to a thermoplastic material for reprocessing or further processing to form articles of a great variety of types.

Thermoplast-coated packing materials on the basis of paper or cardboard as carrier material, i.e. a carrier or substrate material consisting generally of paper material and containing substantially chemically disintegrated vegetable fibrous material, are being used in increasing amounts inter alia in the beverage industry for packaging beverages. Such a beverage carton is generally coated on both sides with a thermoplast such as polyethylene (PE) or polypropylene (PP), the thermoplast content as a rule making up 20–25% by weight of the total beverage carton. The thermoplast layers themselves can in turn be multlply. For better conservation of certain beverage products, for example fruit juices, it is usual, in order to increase the light and aroma tightness of the packing material, to provide at the inner side thereof an extremely thin aluminium layer which is generally embedded between two PE layers. For this purpose, the PE coating material itself is provided during its manufacture with a vapour-deposited aluminium layer. The packing material may further be imprinted either on the carton substrate or externally on the foil coating.

Due to its double-sided coating, the composite carton behaves outwardly generally like a corresponding plastic foil or sheet. Consequently, conventional apparatuses for processing waste paper are not suitable for processing and reuse of such a material. Generally, special steps must be adopted, such as using steam and chemicals and the use of high-consistency working devices in order to disintegrate such a material again.

Beverage packages and other packing materials of similar type consequently remain after emptying in the home generally in domestic refuse and are dispensed with through the local refuse collection. When domestic refuse is dumped the beverage carton decomposes only very poorly, due to its double-sided coating, and is therefore better supplied to a refuse incineration.

Apart from the great amounts of packing cartons of used packages contaminated with residual contents, in the processing of beverage cardboard to beverage packages cuttings also arise as waste which although not contaminated by the beverage content encounter the same difficulties in their possible recycling.

The basic material for packing materials such as beverage cardboards consists essentially of a high-quality fibrous material, the use of which and recycling in the paper industry is desirable, and not only for reasons of avoiding environmental pollution. The considerable thermoplast proportion of about one quarter would also justify recycling. Due to the introduction of a collection system to be organized by the manufacturing and consuming industry, beverage carton will presumably become a separately collected type of waste paper which however the paper-making industry will only be able to process to a very limited extent with its existing apparatuses and then only with relatively small yield of material.

The invention is therefore based on the problem of providing a method for as economical as possible reprocessing of thermoplast-coated packing cardboard which leads to as complete as possible recyclability of the individual materials obtained within the scope of the processing. The invention further has as its object a novel half stuff which can be advantageously further processed to articles of thermoplastic material.

Hereinafter, the term beverage cardboard is intended to include generally packing materials on the basis of cardboard or paper and coated with thermoplasts. The term fibrous material, of which the carrier cardboard consists, is generally to include fibrous materials as are used in known manner for making cardboard in the paper industry. Generally, this is essentially wood broken down chemically or semichemically to give cellulose fibers, although the fibers may include apart from cellulose other constituents of the wood. Thermoplasts are to be understood essentially as polyethylene (PE) and polypropylene (PP). However, further materials with similar behaviour are to be covered by the term.

Detailed investigations have shown that under the action of water as suspension agent and suitable forces beverage cardboard can be extensively physically divided into its constituents, that is into the thermoplast layer and the fibrous material, if the beverage cardboard is divided or cut into small sheet pieces. The thermoplast components disposed in suspension can then be separated in a separating operation from the remaining fibrous suspension so thatafter further washing, draining and drying they can be converted to further processable thermoplast granulate in a conventional agglomerator and regranulator. The fibrous suspension freed from further impurities if necessary can be supplied directly to a paper-making process.

It has further proved possible to separate the coating particles consisting solely of thermoplast where appropriate from those containing an aluminium layer insert. The separation of these two components is carried out in a hydrocyclone means in high aqueous dilution.

The basic steps of the method according to the invention are as follows:

a) providing the packing material substantially freed from external impurities, b) comminuting the packing material to small sheet pieces by the action of tools performing a cutting and/or tearing function or a cutting-like function, c) disintegration of the small sheet pieces in aqueous suspension under the action inter alia of impact, friction and/or shearing forces to suspend the fibrous materials carrying the thermoplast layer and to largely separate the thermoplast parts forming the outer surfaces of the sheet pieces in the suspension from the carrier material, d) separation of the suspension of thermoplast parts and fibrous materials into a first fraction consisting substantially of fibrous materials and a second fraction consisting substantially of thermoplast parts and e) draining the second fraction consisting of thermoplast parts.

In the division of the beverage cardboard into small sheet pieces required by claim 1, said sheet pieces are to be dimensioned in such a manner that firstly the fibrous material is not shortened by too many cutting points on the average and thus impaired in its possible strength development but secondly the possibility is retained of the suspension water penetrating into the center ply of fibrous material rapidly enough from the side edges of the sheet piece and due to the thereby weakened fiber bonding, under the influence of an acceptable amount of energy, the small sheet piece can be split essentially into two plies and then the fibers further detached from the now individual thermoplast layer particles. An excessive shortening of the fibers in the edge region of the small sheet pieces to be produced can be diminished in that in the comminuting of the beverage cardboard into said small sheet pieces the action on the material is a tearing one rather than a cutting one. It is thereby possible in this method step also to avoid the cut edges being sealed by the thermoplast sheets on both sides and access of the dissolving water to the cardboard substrate made difficult due to squashing at the cutting point. It has been found that the small sheet pieces should not exceed 20 mm in their maximum diameter but should preferably lie in the range of 5–12 mm, in particular if possible in the range of about 6–8 mm. The small sheet pieces should as far as possible have substantially the same diameter in all directions, which means that they need not be specifically cut to strip shape or the like.

In a special further development of the method according to the invention the preferably tearing severing of the beverage cardboard into the small sheet pieces and the action of energy for the disintegrating thereof preferably take place in one and the same working operation in a suitable aggregate. The limitation of the sheet pieces to specific sizes can take place within the scope of this method step by providing a sieve which allows the already adequately small sheet pieces to pass but holds back the larger pieces in the comminuting and disintegrating process. The disintegrating process, i.e. the separation as far as possible of the thermoplast particles from the fibrous material, can be completed in an agitating vat with suitable suspension consistency of about 2–4% under the action of the agitation energy.

With relatively easily disintegratable cardboard substrate, it may suffice to separate the small sheet pieces leaving the comminuting aggregate into their constituents in a following suitable agitating vat. However, at least a water addition should take place in the comminuting aggregate.

An aggregate suitable for the method steps described consists for example of a substantially cylindrical housing with a horizontal cylinder axis and an upper charging opening and a lower discharge face formed as sieve bottom. In the housing a tool carrier is arranged which rotates about the cylinder axis and the cutting and/or crushing tools of which arranged on an imaginary cylinder surface cooperate with counter tools which are arranged on the inner surface of the housing substantially along cylinder generatrices thereof. Apparatuses of the type described above are known per se but their use for the method steps described here is novel. In tests, for the comminution and disintegration of beverage cardboard the wash granulator CS 500/1000IIIA marketed by the Condux company has been used successfully, having sieve holes in the region of about 8–10 mm.

As stated, the suspension leaving such a granulator can be intermediately stored with further action of an agitating mechanism at a pumpable consistency of about 2–4%, the dissolving or integrating process continuing.

To increase the pumpability of the suspension, in the wash granulator either fresh water or cleaned process water is added. For the disintegrating operation neither steam nor any chemicals at all are required.

The suspension containing the disintegrated and comminuted beverage cardboard is then supplied to a separating stage in which the suspension is separated into a first fraction which is essentially a fibrous suspension and a second fraction which in suspension contains essentially the thermoplast particles. A suitable aggregate for the separation has been found to be for example the Voith sieve contaminex marketed by the Voith company of Heidenheim, using a sieve of about 3 mm. This apparatus additionally comprises a heavy trash lock via which collected heavy components such as carton closure parts, rigid plastics and the like, can be intermittently discharged. The thermoplast fraction is advantageously then washed to free it from further fibrous material which can be supplied to the fibrous fraction from the first separating stage. As after-wash apparatus for the thermoplast fraction, a Voith turbowasher having a sieve mesh size of 2.6 mm diameter may for example be used in intermittent operation. The first fibrous material fraction is also expediently subjected to a fine sorting with a material density of about 1%. The thermoplast particles further separated in this fine sorting can conversely be supplied to the thermoplast fraction. Such a fine sorting may be carried out with known means. Tests have shown that with such a following fine-sorting step for the fibrous suspension all visible coloured sheet particles, even of finer structure, can be separated as rejects.

Used beverage carton cardboard is generally imprinted on its outer surface. The comminution and mechanical disintegration of the cardboard can lead to dye particles, even when they were originally on the thermoplast foil, partially becoming detached in very fine form and getting into the fibrous material suspension in which they manifest themselves as a clouding. To remove these extremely fine impurities in the form of printing ink particles and the like from the regenerated fibrous material, it is expedient to arrange after the fine sorting a wash floatation of the fibrous material. This results in a substantial brightening of the fibrous material which is generally very desirable for paper making. To remove printing ink constituents from fibrous material suspensions well-known techniques from waste paper processing may be adopted.

The finally cleaned regenerate fibrous material thus obtained can then be concentrated to a normal vat consistency and supplied directly to the production of new paper. If an integrated further processing is not possible, the fibrous material can of course also be concentrated and dried, but this may impair the economy of the method.

The thermoplast particle fraction obtained from the separating operation is expediently freed from any heavier particles in a cyclone and the accept of the cyclone is predrained via a draining centrifuge and possibly further dried. Such a regenerate would in itself already be handlable in order to permit filling into bags or containers of a further processing. Expediently, however, a further processing to the form of a granulate generally usual in the plastic processing industry takes place integrated in the same apparatus. The agglomeration and regranulation of the thermoplast material may for example be carried out in a Pallmann apparatus of type PFV 250/60. The granulate obtained is a free flowing product which is suitable for further processing to various products. This granulate obtained as regenerate still contains a small fibrous proportion which can lie in the order of magnitude of 5%. If beverage cardboard is also processed which has an inner coating containing an aluminium layer, in the thermoplast particle fraction particles collect having this aluminium inlay. It has astonishingly been found that these aluminium-containing thermoplast particles can be separated from pure thermoplast particles in aqueous suspension of as far as possible less than 1% abs. dry, preferably at suspension densities of about 0.5% by weight abs. dry, in a hydrocyclone apparatus under suitable conditions to be set by the person skilled in the art. The aluminium proportion in the aluminium-containing thermoplast particles is about 15 to 20% by weight. As a result, these particles have a specific weight of >1 so that their separation from pure thermoplasts with a specific weight of 0.9 is possible in the hydrocyclone apparatus. Thus, two thermoplast fractions can be produced, one of which contains aluminium but the other of which consists essentially, i.e. except for a small residual fibrous content, of pure thermoplast and is suitable directly for recycling.

Tests with low-pressure polyethylene (LPPE) have shown that the regenerate can be satisfactorily processed in the injection molding method. Apparently because of its fibrous content, compared with fresh LPPE it even has a higher tensile strength and a higher flexural strength. The elongation at break is however correspondingly lower. The regenerate can therefore advantageously be employed for all purposes where higher tensile strength and flexural strength are desired and a high elongation at break can be dispensed with. A certain amount of aluminium from aluminium foil constituents of the beverage cardboard can also have an advantageous effect on the properties of the regenerate, for example on the slip properties of the products made therefrom. The only important point is that the processing temperature of the regenerate granulate is kept beneath a temperature at which the fibers contained in the regenerate decompose under heat. The maximum possible temperature can be different depending on the proportion of fibrous material. It should not lie above 230° C. and advantageously lies beneath 180° C.; however, the lower limit should not extend into the crystallite melting region for LPPE lying at 125° C.

The favourable properties observed in the thermoplast regenerate can also be achieved by adding a certain amount of paper fibrous materials to fresh thermoplast material. However, if the advantageous properties can be achieved by a regenerate material then that will be the method which is generally to be preferred. It is in any case also possible in the recovery of thermoplast regenerate to influence the properties of the regenerate by controlling the fibrous material content in the course of the reprocessing described above, or, should this not be directly possible, to adjust the fibrous material content to a predetermined desired value by subsequent addition of for example likewise regenerated fibrous material. In this manner, from the reprocessing of beverage cardboard a novel thermoplastic material with special properties is obtained.

The reprocessing method described above is readily suitable for processing beverage cardboard occurring as waste in the processing thereof. For the processing of used beverage cardboard which is contaminated by beverage residues, however, an additional preliminary stage is necessary for the reprocessing.

It has been found that the beverage residues adhering to the used cardboard and similar external impurities can as a rule be removed even with cold water as rinsing agent to such an extent that the rinsed cardboard can be further processed by the method described above. A requirement for an effective rinsing operation is however that the used cardboard can in fact be flushed by the rinsing agent from all sides. To do this, the invention provides that the used beverage cartons are cut up in such a manner that the remaining cut pieces can be effectively flushed all round by the rinsing agent. This step ensures that precisely those surfaces of the packing material which formed the inner surface of a carton are rinsed. It has been found that the objective of a good cleaning of the used packing material can be achieved when the cut pieces are not larger than 10 cm in extent. Advantageously, the cut pieces have a size at which the maximum diameter is 3-7 cm, preferably about 5 cm.

In this method step the cutting operation is expediently to be conducted in such a manner that the thermoplast coatings are squashed as far as possible along the cut edge in order to prevent penetration of the rinsing liquid into the fibrous inner layer of the cardboard. The division of the beverage cardboard into individual separate sheet pieces can take place before the actual rinsing operations; advantageously, however, it is integrated into the rinsing operation. The rinsing operation can then take place in such a manner that the used cartons are brought into contact with the rinsing agent directly at the start of the processing in order to rinse off contaminants adhering to the outside of the cartons whilst the latter are then comminuted during the further rinsing operation and the resulting sheet portions then intensely flushed with rinsing agent. In addition to the work of the cutting tools a slight mechanical agitation may be performed to assist the detachment from the foreign material on the cardboard, avoiding however that any disintegration of the cardboard itself takes place in this method stage. The disintegration means should have regions or special provisions with the aid of which heavy parts are separated out of the waste material before the comminution, not least to preserve the blades.

This decontamination wash may also be carried out in two stages in that old cardboard delivered in bags or pressed bales after a possibly effected disintegration of said bindings into individual cartons are firstly prewashed, then coarsely cut and the cut pieces then again washed.

The washed beverage cardboard is largely freed from rinsing agent in a draining aggregate, for example a draining screw, before passing for further processing for example into the wash granulator described above. The rinsing agent is removed directly from the processing sequence and supplied if available directly to a biological clarifying tank. The rinsing water is generally only weakly polluted with CSB.

The division of the beverage cardboard into the sheet portions which can be flushed with rinsing agent can take place for example in an apparatus in the housing of which two rotating blade shafts equipped with disc blades are arranged, two respective opposite blades of the two shafts being in shearing engagement with each other. If the cardboard is introduced into the draw-in region between the two cutter shafts, it is divided by cutting into correspondingly smaller sheet portions.

The use of such tools for the purpose described here is novel.

It is possible in the processing of used packing materials to integrate the method steps of dividing the material into flushable sheet portions, washing said portions and subsequent further comminution and defibration in one processing aggregate. However, in such a case the rinsing liquid should substantially be prevented from reaching the fine comminuting step. To free the substantially defibrated material leaving the combined aggregate from further rinsing liquid it is expedient to drain said material partially and carry out a subsequent rinsing with fresh water or purified process water. The collected rinsing liquid can be circulated in this region but a proportion thereof should continuously be withdrawn from the process. This fraction is replaced by the fresh water from the after-rinsing.

With the processing method described it is possible to process even used beverage cardboard from waste material collections completely to give regenerate materials in such a manner that only an extremely small amount of real waste material remains, this amount being in many cases even less than 1%.

To further explain the invention a method scheme of an apparatus example of embodiment for carrying out the method according to the invention is attached. The scheme will be clear to the person skilled in this art with the aid of the following list of reference numerals.

LIST OF REFERENCE NUMERALS

2 Feed conveyor belt
4 Used beverage cardboard
6 Singling conveyor belt of elevated speed
8 Vibrating sieve
10 Processing apparatus
12 1st comminuting aggregate
14 Circulating trough with agitating mechanism
16 2nd comminuting aggregate
18 Concentrator
20 Rinsing liquid circulation vat
22 Agitating vat
24 Fractionator
26 Heavy trash separator
28 After-fractionator
30 Fibrous material vat
32 Vertical sorter
34 Diluting vat
36 Wash floatation
38 Floating material concentrator
40 Substance concentrator
42 Finish material vat
44 Residual material vat for non-defibratable materials
46 Two-stage cyclone separator for materials specifically heavier than thermoplast, or aluminium-containing thermoplast parts
48 Centrifuge thermoplast draining
50 Thermoplast drying
52 Thermoplast granulation
54 Dump container
56 Collecting vat for process filtrate for biological clarifying
58 Water supply

I claim:

1. Method for reprocessing used thermoplast-coated packing material comprising a carrier material including essentially vegetable fibrous materials, said method comprising the following steps:

a) washing said used packing material with a rinsing agent to decontaminate said packing material,
    b) substantially separating the packing material from external impurities and said rinsing agent,
    c) comminuting the packing material to small sheet pieces by the action of tools performing at least one a cutting and tearing function,
    d) disintegrating the small sheet pieces in aqueous suspension under the action of at least one of impact, friction and shearing forces to suspend the fibrous materials carrying the thermoplast coating and to largely separate the thermoplast particles forming the outer surfaces of the sheet pieces in the suspension from the carrier material,
    e) separating the suspension of thermoplast particles and fibrous materials into a first fraction consisting essentially of fibrous materials and a second fraction consisting essentially of thermoplast particles, and
    f) draining the thermoplast particles.

2. Method according to claim 1, characterized in that the comminution of the packing material is carried out to give small sheet pieces having a maximum diameter of 20 mm.

3. Method according to claim 2, characterized in that the maximum diameter of the small sheet pieces is 5–12 mm.

4. Method according to claim 1, characterized in that the comminution and disintegration steps are carried out substantially simultaneously.

5. Method according to claim 1, characterized in that for the method step d) fresh water or purified process water is used.

6. Method according to claim 1, characterized in that the drained thermoplast particles are dried if necessary and transformed to a further processable thermoplast granulate.

7. Method according to claim 6, characterized in that the possible drying and granulation of the thermoplast particles is carried out at temperatures below 180° C.

8. Method according to claim 1, characterized in the first fraction and is subjected to at least one second fine sorting stage and a resulting fraction consisting essentially of thermoplast particles is supplied to the second fraction from method step e).

9. Method according to claim 1 characterized in that the second fraction from method step e) is subjected to an after-wash and any fibrous material washed out therefrom is supplied to the first fraction from method step e).

10. Method according to claim 1 for reprocessing thermoplast-coated packing material, the coating of which further contains an aluminum layer, characterized in that the second fraction from method step e) is divided into a fraction of substantially pure thermoplast particles and a fraction of aluminum-coating thermoplast particles.

11. Method according to claim 10, characterized in that the division of the second fraction into the fraction of substantially pure thermoplast particles and the fraction of aluminum-containing thermoplast particles takes place in a hydrocyclone in a liquid suspension with less than 1% by weight thermoplast particles.

12. Method according to claim 1, characterized in that the used packing material is cut into small sheet portions before or during the decontaminating wash.

13. Method according to claim 12, characterized in that said small sheet portions have a maximum size of 10 cm.

14. Method according to claim 12 characterized in that the packing material is prewashed prior to the step of cutting the packing material into said small sheet portions.

15. Method according to claim 1, characterized in that said rinsing agent is water.

16. Method according to claim 1, characterized in that the separated rinsing agent is collected and used in circulation, with a fraction being continuously withdrawn from the process.

17. Method according to claim 1, characterized in that the method is performed in a combined processing aggregate.

18. Method according to claim 3 wherein the maximum diameter of the small sheet pieces is about 8 mm.

19. Method according to claim 7 wherein said drying and granulation temperature is beneath 150° C.

20. Method according to claim 13 wherein said size is 3–7 cm.

21. The method of claim 16, wherein said rinsing agent fraction withdrawn from the process is directed to a biological clarifying tank.

* * * * *